(12) United States Patent
Elsaesser (10) Patent No.: US 11,695,848 B2
(45) Date of Patent: Jul. 4, 2023

(54) INTEGRATION AND TRANSFORMATION FRAMEWORK

(71) Applicant: SAP SE, Walldorf (DE)

(72) Inventor: Thomas Elsaesser, Hockenheim (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 17/411,769

(22) Filed: Aug. 25, 2021

(65) Prior Publication Data

US 2023/0060137 A1 Mar. 2, 2023

(51) Int. Cl.
- *H04L 12/00* (2006.01)
- *H04L 67/565* (2022.01)
- *G06F 9/54* (2006.01)
- *G06F 40/154* (2020.01)
- *G06F 16/25* (2019.01)

(52) U.S. Cl.
CPC ............ *H04L 67/565* (2022.05); *G06F 9/545* (2013.01); *G06F 16/258* (2019.01); *G06F 40/154* (2020.01)

(58) Field of Classification Search
CPC ..... H04L 67/565; G06F 9/545; G06F 16/258; G06F 40/154
USPC ......................................... 709/221, 224, 246
See application file for complete search history.

(56) References Cited

U.S. PATENT DOCUMENTS

| | | | |
|---|---|---|---|
| 6,507,857 B1 | 1/2003 | Yalcinalp | |
| 7,149,750 B2 * | 12/2006 | Chadwick | G06F 16/40 707/999.102 |
| 7,228,497 B2 | 6/2007 | Lander | |
| 7,590,987 B2 | 9/2009 | Behrendt et al. | |
| 9,098,558 B2 | 8/2015 | Arshad et al. | |
| 10,140,266 B2 | 11/2018 | Falk et al. | |
| 10,180,931 B2 | 1/2019 | Freese | |
| 2002/0099735 A1 | 7/2002 | Schroeder et al. | |
| 2006/0074563 A1 * | 4/2006 | Jevons | G01N 35/00584 702/19 |
| 2008/0222517 A1 * | 9/2008 | Halim | G06F 40/143 715/239 |
| 2015/0331873 A1 * | 11/2015 | D'Amato | G06F 16/188 707/827 |
| 2018/0165048 A1 * | 6/2018 | Ikeda | H04N 1/00244 |

(Continued)

FOREIGN PATENT DOCUMENTS

EP 449494 A * 10/1991 ....... G06F 17/30569

OTHER PUBLICATIONS

"Integration Framework—Using XSLT to transform inbound transactions (Maximo Asset Management)", IBM Support, [Online]. Retrieved from the Internet: <URL: https://www.ibm.com/support/pages>, (Accessed Sep. 2, 2022), 3 pgs.

(Continued)

*Primary Examiner* — Frantz Coby
(74) *Attorney, Agent, or Firm* — Schwegman, Lundberg & Woessner, P.A.

(57) ABSTRACT

A solution is provided that significantly reduces the complexity of existing solutions for creating interfaces in a computer system. More particularly, a middleware common to such solutions is removed and a low-level approach is taken where customer-specific logic is processed on an Extensible Stylesheet Language transformation (XSLT) processor instead. Additional transformations may also then be imported from external XSLT editors making it very easy to generate a backend configuration for interfaces.

20 Claims, 9 Drawing Sheets

(56) References Cited

U.S. PATENT DOCUMENTS

2021/0311707 A1* 10/2021 Baker .................. G06F 9/5083
2022/0109738 A1*  4/2022 Shr ...................... H04L 67/565
2022/0182701 A1*  6/2022 McMahon ......... H04N 21/4222

OTHER PUBLICATIONS

"Omnichannel Content Management Platform", Censhare, [Online]. Retrieved from the Internet: <URL: https://www.censhare.com/en>, (Accessed Sep. 6, 2022), 13 pgs.

"XSLT EDI to EDI conversion", Axway, [Online]. Retrieved from the Internet: <URL: https://docs.axway.com/>, (Accessed Sep. 2, 2022), 2 pgs.

Rohna, Michal, "SAP CPI: Technical guide to build a single XSLT mapping for multiple input types", INT4, [Online]. Retrieved from the Internet: <URL: https://int4.com/sap-cpi-technical-guide-to-build-a-single-xslt-mapping-for-multiple-input-types>, (Apr. 21, 2020), 8 pgs.

\* cited by examiner

FIT Framework Task Definition

302

Select | Process Definitions | Namespaces | Task Definitions | You Can Also ∨

⟳ Refresh

▸ ▦ Task Definitions

| Task Definition | Task Type |
|---|---|
| ◉ 10_ExtractPLMXML | XSLT |
| ○ 11_ExtractKEMXML | XSLT |
| ○ 20_MapToSAP | XSLT |
| ○ 30_SaveMaterial | FUNC |

400

▦ Task Definition  ✱ New  Edit  🗑 Delete

Task Definition: 10_ExtractPLMXML
Task Type: XSLT Transformation
Input Content For...: XML file
Input DDIC Struct...:
Input Function Mo...:
Output Content Fo...: XML file
Output DDIC Struc...:
Output Function M...:
Transformation:
Function Module:
COMMIT WORK: No COMMIT WORK
Task Definition ID: 0050568A76151E...
Namespace ID: 0050568A76151E...
Created: ELSAESSERT 29....
Changed: ELSAESSERT 04....

402

⊞ 0

▸ ▦ Transformation | Edit | ▸ Execute

Task Definition: 10_ExtractPLMXML
Input Data Selector:

404

```
<xs1:transform version="1.0" xmlns:xs1="http:/...
  <xs1:strip-space elements="*"/>
  <xs1:key name="keyProdRevView" match="p...
  <xs1:key name="keyPart" match="plmxml:Part"...
  <xs1:key name="keyProdInst" match="plmxml...
  <xs1::key name="keyInst" match="plmxml:Insta...
  <xs1:template name="tInstanceRefs">
  <xs1:param name="pInstString"/>
  <xs1:choose>
    <xs1:when test="string-length($pInstString)...
    <xs1:when test="contains ($pInstString, ' ')">
      <item>
        <xsl:value-of select="substring-before($pl...
      </item>
      <xsl:call-template name="tInstanceRefs">
```

▸ ▦

| | External Name |
|---|---|
| ◉ | A3236105205.plmxml |
| ○ | PLMXML (without ProductView) |
| ○ | medium |
| ○ | transmitter |

406

▸ ▦ Task Definition  ✱ New  Edit  🗑 Delete

File Name:
Data Length:
Persistence Data Content: Keine ausgewahlt

```
</acx:Header>
<ProductDef>
<InstanceGraph rootRefs="inst0">
<Instance id="inst0" partRef="elem0">
  <UserData type="customObjectValue...
    <UserValue title="occurrenceUUID"...
  </UserData>
</Instance>
<Part id="elem0" name="A3236105205,...
  <ApplicationRef application="Smara...
  WKl3eatSCFqIPdkkOg_CAK9WMkA6tfdUhLy...
  rOCldEfpamR3FuJGPAdg==" />
  <UserData>
    <UserValue title="PartNumber" val...
```

408

▸ ▦ Transformation Result

Input Length: 1209633
Output Length: 367352
Duration: 0.2540450

```
<?xml version="1.0" encoding="utf-8"?>
<ProductInstances xmlns:plmxml1="http://ww...
  <item>
```

| | FIT Framework Import Tool | | | | | | | |
|---|---|---|---|---|---|---|---|---|
| Process Instances Task Instances Task Logs Log Summary Key Field Log | | | | | | | | ⚙ ⌄ ⑦ ⌄ |
| ⌄ Log Summary ↻ Refresh | | | | | | | | |
| Standard ⊙ 602 | | | | 608 | 610 | 612 | | 🔍 ⌄ ⚙ |
| Type | Message Text | Counter | Display Task Log 604 | Restart | Process Definition | Task Definition | Task Status | Message class 614 | Message number 616 |
| ○ | Trying to create: $1 $2 | 412 | Display | | 10_Import_PLMXML | 30_SaveMaterial | Completed | MK | 102 |
| ○ | The material cannot... | 187 | Display | | 10_Import_PLMXML | 30_SaveMaterial | Completed | MG | 160 |
| ○ | Trying to create: $1 $2 | 412 | Display | 606 | 10_Import_PLMXML | 30_SaveMaterial | Completed | MK | 103 |
| ○ | No changes made | 340 | Display | | 10_Import_PLMXML | 30_SaveMaterial | Completed | M3 | 810 |
| ○ | Material $1 created | 225 | Display | | 10_Import_PLMXML | 30_SaveMaterial | Completed | M3 | 800 |
| ○ | Material $1 charged | 72 | Display | | 10_Import_PLMXML | 30_SaveMaterial | Completed | M3 | 801 |
| ○ | Trying to create: $1 $2 | 38 | Display | Restart | 10_Import_PLMXML | 30_SaveMaterial | Error | MK | 102 |
| ○ | The material number... | 38 | Display | Restart | 10_Import_PLMXML | 30_SaveMaterial | Error | M3 | 564 |
| ○ | Trying to create: $1 $2 | 38 | Display | Restart | 10_Import_PLMXML | 30_SaveMaterial | Error | MK | 103 |
| ○ | The material $1 does... | 38 | Display | | 10_Import_PLMXML | 30_SaveMaterial | Error | M3 | 305 |

FIG. 9

INTEGRATION AND TRANSFORMATION FRAMEWORK

BACKGROUND

An application interface framework (AIF) is a solution that allows users to create, deploy, monitor, and manage various different application interfaces in one place. Business users can also use AIFs to build processes, called tasks, to be performed on structured data, such as data stored in Extensible Markup Language (XML) format. The tasks indicate various operations to be performed on the data, allowing aspects of the data to be reflected in the created application interfaces when the tasks are performed on data obtained from one or more entities.

BRIEF DESCRIPTION OF DRAWINGS

The present disclosure is illustrated by way of example and not limitation in the figures of the accompanying drawings, in which like references indicate similar elements.

DETAILED DESCRIPTION

The description that follows discusses illustrative systems, methods, techniques, instruction sequences, and computing machine program products. In the following description, for purposes of explanation, numerous specific details are set forth in order to provide an understanding of various example embodiments of the present subject matter. It will be evident, however, to those skilled in the art, that various example embodiments of the present subject matter may be practiced without these specific details.

A technical issue that arises with AIFs is that their architecture is quite complex and requires significant effort to configure and customize new interfaces. The complexity is based on the large number of different layers and on typically proprietary ways application logic is implemented. It can be difficult to find users with the level of knowledge required to configure and customize the entities, especially in defining the tasks needed to utilize structured data from entities.

In a typical case, it may be beneficial for data to be imported from multiple different databases into a single database. The databases, however, may be offered/maintained by different entities, and thus may have different formats and schemas, making it difficult to easily take data from one database and store it in another database. This pertains to other types of applications other than databases as well, as, for example, a cloud application may be designed to perform operations on objects in a particular format that may differ from the objects on which other applications, which may be linked to the cloud application, perform operations.

As such, certain types of users, such as administrators, may wish to create interfaces that are able to quickly transform data/objects from one format to another format.

Figure 1:
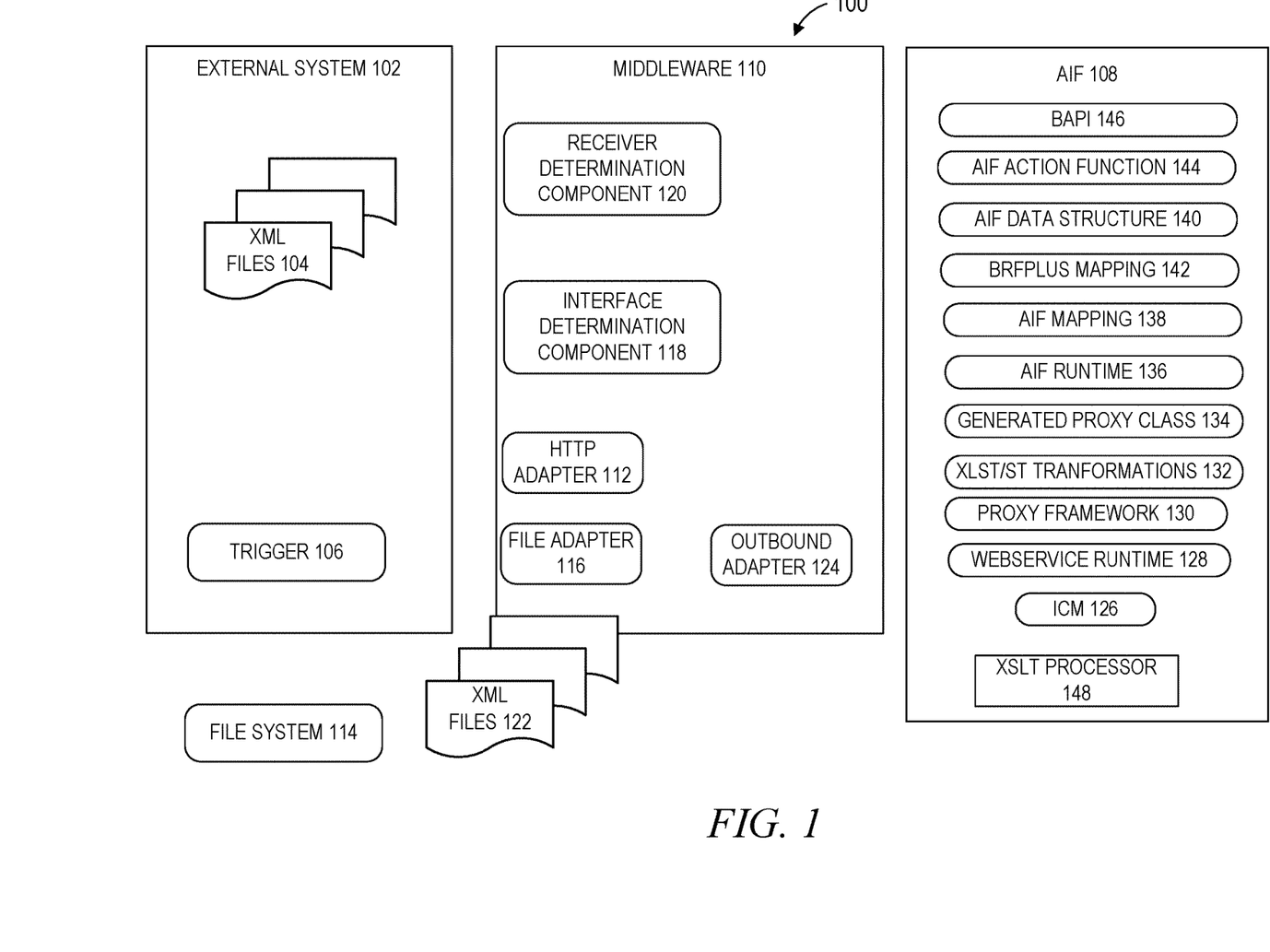
FIG. 1 is a block diagram illustrating a system for implementing an AIF using middleware and a custom specific web service.

FIG. 1 is a block diagram illustrating a system 100 for implementing an AIF using middleware and a custom specific web service. More particularly, an external system 102 operated by an entity may store external data in structured format, such as in the form of XML files 104. A trigger 106 on the external system 102 may cause the need to send one or more of the XML files 104 to an AIF 108. Here, middleware 110 may be used to aid in this process, providing an adapter such as a Hypertext Transfer Protocol (HTTP) Adapter 112, which receives commands from the trigger 106. The trigger 106 may also receive files from a file system 114 via a file adapter 116. An interface determination component 118 then determines to which interface(s) the transmitted XML files apply. Additionally, a receiver determination component 120 determines which receiver will be receiving the transmitted XML files 122, and an outbound adapter 124 then communicates with an Internet Communications Manager (ICM) 126 on the AIF 108, which may also utilize an HTTP framework. The ICM 126 dispatches the received HTTP call to an Advanced Business Application Programming (ABAP) layer. ABAP is a programming language created by SAP™ SE of Frankfurt, Germany. ABAP utilizes logical databases, which provide a high level of abstraction from basic database level(s). ABAP code exists in two forms: source code, which can be viewed and edited with ABAP workbench tools, and generated code. ABAP programs execute under the control of a runtime system, which is responsible for processing ABAP statements, controlling the flow logic of screens. and responding to events.

A WebService Runtime 128 persists the message and ensures quality of service (QoS). A proxy framework 130 (called by a generic HTTP handler class) transforms the XML data into data structures. More particularly, a proxy object comprises nested ABAP data dictionary (DDIC) structures (not pictured) generated Extensible Stylesheet Language Transformations (XSLT)/Simple Transformations (ST) transformations 132 and a generated proxy class 134. The proxy framework 130 transforms the XML data into the DDIC structures using the generated XSLT/ST transformations 132.

For implementation of the backend logic, the AIF 108 is used. More particularly, the generated proxy class 134 calls a generic AIF runtime 136. The AIF runtime 136 reads the configuration of this specific interface, which determines the further flow. Particularly, an AIF mapping component 138 takes the generated DDIC structure as input, which represents one to one the data received from the middleware 110. The output of the AIF mapping component 138 is AIF data structure 140, which is defined by the AIF 108. Customers, however, do not need to use much functionality of AIF mapping capabilities, and may prefer a Business Rules Framework plus (BRFplus) framework to define business rules through a web user interface. BRFplus mapping 142 may run as an interpreter (performing all defined actions, rules, mappings, functions) or may generate ABAP code that implements the business rule. As a result of this, the data structure 140 contains all data in a target format, and an AIF action function 144 (developed by the interface developer) is called. This AIF action function 144 typically, after more custom coding, calls a Business Application Programming Interface (BAPI) 144, which is the classical API layer of an ABAP application.

The AIF 108 further includes an XSLT processor 148, which is used by the proxy framework to transform the XML data into data structures. More particularly, an XSLT processor 148 takes one or more XML source documents, plus one or more XSLT stylesheets, and processes them to produce an output document. In contrast to imperative programming languages like C, XSLT is declarative. The basic processing paradigm is pattern matching. Rather than listing an imperative sequence of actions to perform in a stateful environment, template rules only define how to handle a node matching a particular XPath-like pattern, if the processor should happen to encounter one, and the contents of the templates effectively comprise functional expressions that directly represent their evaluated form: the result tree, which is the basis of the processor's output.

A typical XSLT processor behaves as follows. First, assuming a stylesheet has already been read and prepared, the processor builds a source tree from the input XML document. It then processes the source tree's root node, finds the best-matching template for that node in the stylesheet, and evaluates the template's contents. Instructions in each template generally direct the processor to either create nodes in the result tree or to process more nodes in the source tree in the same way as the root node. Finally, the result tree is serialized as XML or HyperText Markup Language (HTML) text.

Examples of XSLT processors include RaptoXML, MSXML, Saxon, and Xalan.

Figure 2:
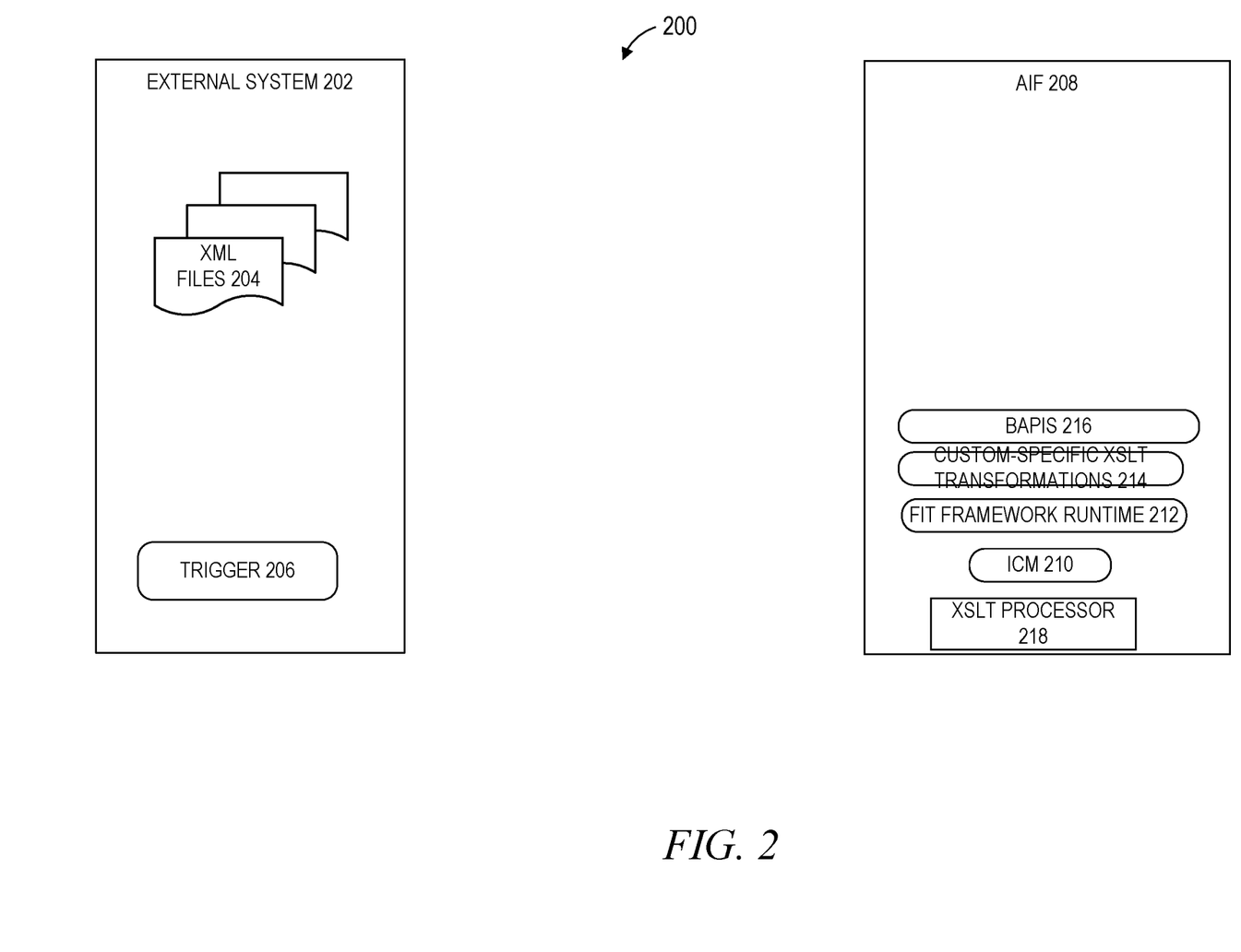
FIG. 2 is a block diagram illustrating a system for implementing an AIF using a fast integration and transformation (FIT) framework, in accordance with an example embodiment.

As mentioned briefly above, in an example embodiment, a solution is provided that significantly reduces the complexity of existing solutions. FIG. 2 is a block diagram illustrating a system 200 for implementing an AIF using a FIT framework, in accordance with an example embodiment. Notably, there is no need for the middleware 110 of FIG. 1. Rather, a low-level approach is taken where customer-specific logic is processed on a XSLT processor instead. Additional transformations may also then be imported from external XSLT editors making it very easy to generate a backend configuration for interfaces.

More particularly, an external system 202 operated by an entity may store external data in structured format, such as in the form of XML files 204. A trigger 206 on the external system 202 may cause the need to send one or more of the XML files 204 to an AIF 208. This is sent by file transfer or HTTP(s) directly to an ICM 210 of the AIF 208 (or alternatively to cloud connectors if no direct connection is possible). ICM 210 receives the HTTP call and dispatches it directly into an ABAP, which in this case is the FIT framework runtime 212. The FIT framework runtime 212 then may persist the message and ensure quality of service. Based on the Uniform Resource Locator (URL) (HTTP header or URL parameters), the FIT framework runtime 212 determines the further flow, which may include calling a custom-specific XSLT/ST transformations 214, which contain the complete processing logic such as value/structure mappings, field conversions, consistency/value checks, serialization, filters, splitting and branching, and parallelization. It may also include a direct BAPI call (without the need for custom coding) to one or more BAPIs 216.

By removing the overhead of many generic layers, this reduces the number of lines of executed coding and thus allows the FIT framework runtime 212 to process data faster than prior art solutions. Additionally, by pushing the processing logic into the XSLT processor 218, the data can be processed much faster than the same amount of data and logic in ABAP, especially with generic coding such as field symbols and references. While both ABAP and CSLT are fourth-generation programming languages, each ABAP command is interpreted by the ABAP runtime, which leads to many single Central Processing Unit (CPU) commands. XSLT, on the other hand, can be implemented in a C++ kernel, which is much closer to a CPU layer. As a result, the same logic (implemented in one XSLT/ST transformation) leads to fewer CPU commands as a comparable ABAP program. Additionally, if the ABAP program is generic and iterates through each and every field on a high level, this can be very time consuming compared to the more efficient approach of the XSLT processor.

Furthermore, in an example embodiment, the FIT framework allows for the defining and testing of XLST transformations easily. Furthermore, parallel processing and sequencing are supported by the FIT framework.

Additionally, in an example embodiment, the AIF 208 may be implemented as part of a cloud application system, such as the SAP™ Application system. The SAP™ Application system may operate on data objects using a first data model that is specific to the SAP™ Application System, known as SAP™ standard. Thus, in this embodiment, a user, such as an administrator, may wish to create databases to allow data objects from other data models to be easily transformed into data objects for the SAP™ standard data model.

Figure 3:
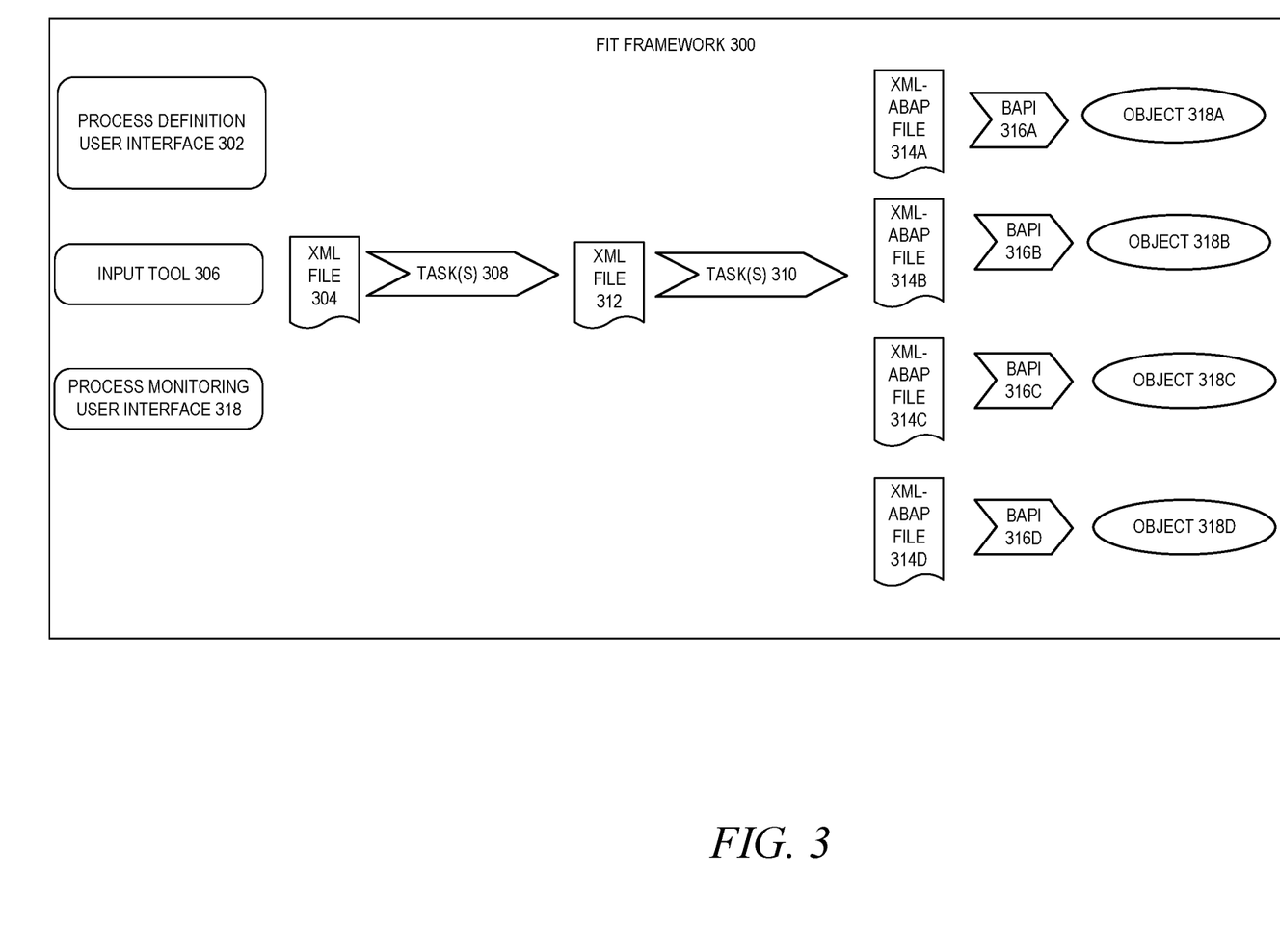
FIG. 3 is a block diagram illustrating an architecture of a FIT framework, in accordance with an example embodiment.

FIG. 3 is a block diagram illustrating an architecture of a FIT framework 300, in accordance with an example embodiment. A process definition user interface 302 provides a graphical user interface (GUI) where a user can define a process. This process may include one or more transformation tasks, which may be performed in series or parallel (or combination of the two) on an input XML, file 304 that is imported using import tool 306. As described earlier, this process can be used to generate one or more XSLT transformations and splits. For purposes of this figure, tasks 308 may include business logic such as mapping, aggregation, and validation operations, while tasks 310 include splits, such as splitting, packaging, parallel processing, and mass restarts. The tasks 308 transform XML, file 304 into XML file 312, and tasks 310 split XML file 312 into XML-ABAP files 314A-314D, which can then be fed to BAPIs 316A-316D to eventually create objects 318A-318D. The objects 318A-318D may define a custom interface.

A processing monitoring user interface 320 provides a GUI where a user can monitor one or more defined processes.

The entire process is controlled by a FIT framework engine, which relies extensively on an XSLT processor.

The process definition user interface 302 allows for the definition of all aspects of the process, including a process definition, task definitions, and all the relationships between them.

It should be noted that the XML Files, such as XML file 304 and XML file 312 are only examples of one type of structured data file on which aspects of the present disclosure may be applied. Other types of structured data files, such as Javascript Object Notation (JSON), Comma-Separated Values (CSV), and XLS files, could be utilized in lieu of, or in addition to, XML files.

One example of a task written in XSLT is provided herein. Here, the task will be applied to an XML document to convert it to another XML document with a different format. The XSLT task is as follows:

```
<?xml version="1.0" encoding="UTF-8"?>
<xsl:stylesheet xmlns:xsl="http://www.w3.org/1999/XSL/Transform" version="1.0">
    <xsl:output method="xml" indent="yes"/>
    <xsl:template match="/persons">
        <root>
            <xsl:apply-templates select="person"/>
        </root>
    </xsl:template>
    <xsl:template match="person">
        <name username="{@username}">
            <xsl:value-of select="name"/>
        </name>
    </xsl:template>
</xsl:stylesheet>
```

When the XSLT task is applied following XML document:

```
<?xml version="1.0" ?>
<persons>
    <person username="JS1">
        <name>John</name>
        <family-name>Smith</family-name>
    </person>
    <person username="MI1">
        <name>Morka</name>
        <family-name>Ismincius</family-name>
    </person>
</persons>
``` the resulting XML file is as follows:

```
<?xml version="1.0" encoding="UTF-8"?>
<root>
    <name username="JS1">John</name>
    <name username="MI1">Morka</name>
</root>
```

Figure 4:
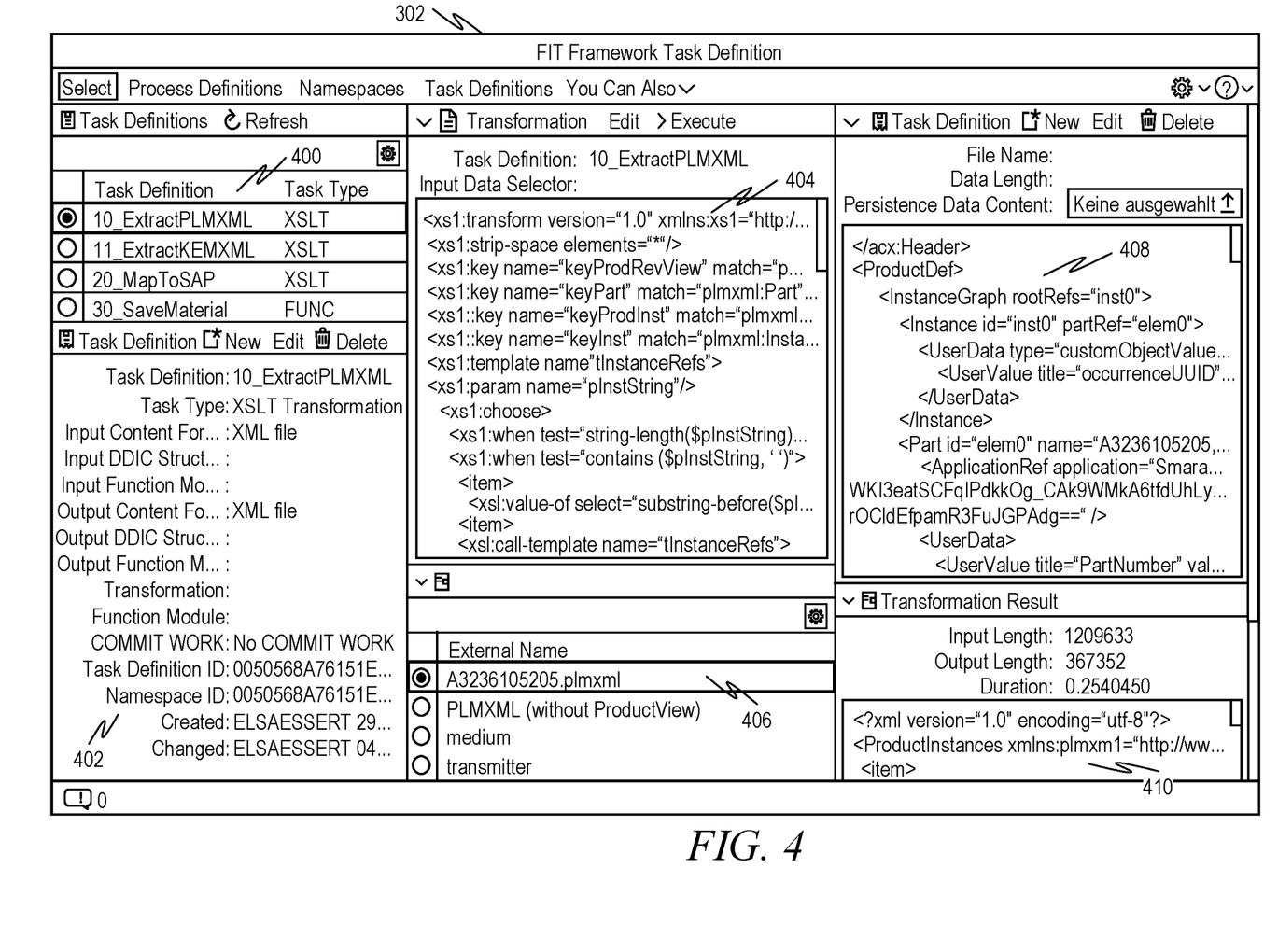
FIG. 4 is a diagram illustrating a screen capture of a process definition user interface, in accordance with an example embodiment.

FIG. 4 is a diagram illustrating a screen capture of a process definition user interface 302, in accordance with an example embodiment. Here, a user can elect to edit one of one more tasks 400 of a process. A task definition 402 for the selected task is displayed. A transformation area 404 allows the user to write the XSLT code that implements the transformation. A test data file selection area 406 allows a user to select one or more test files on which to test the transformation. The contents of the test file may be displayed in test data file area 408, and the results of transforming the selected test data file using the transformation may be displayed in transformation result area 410.

Figure 5:
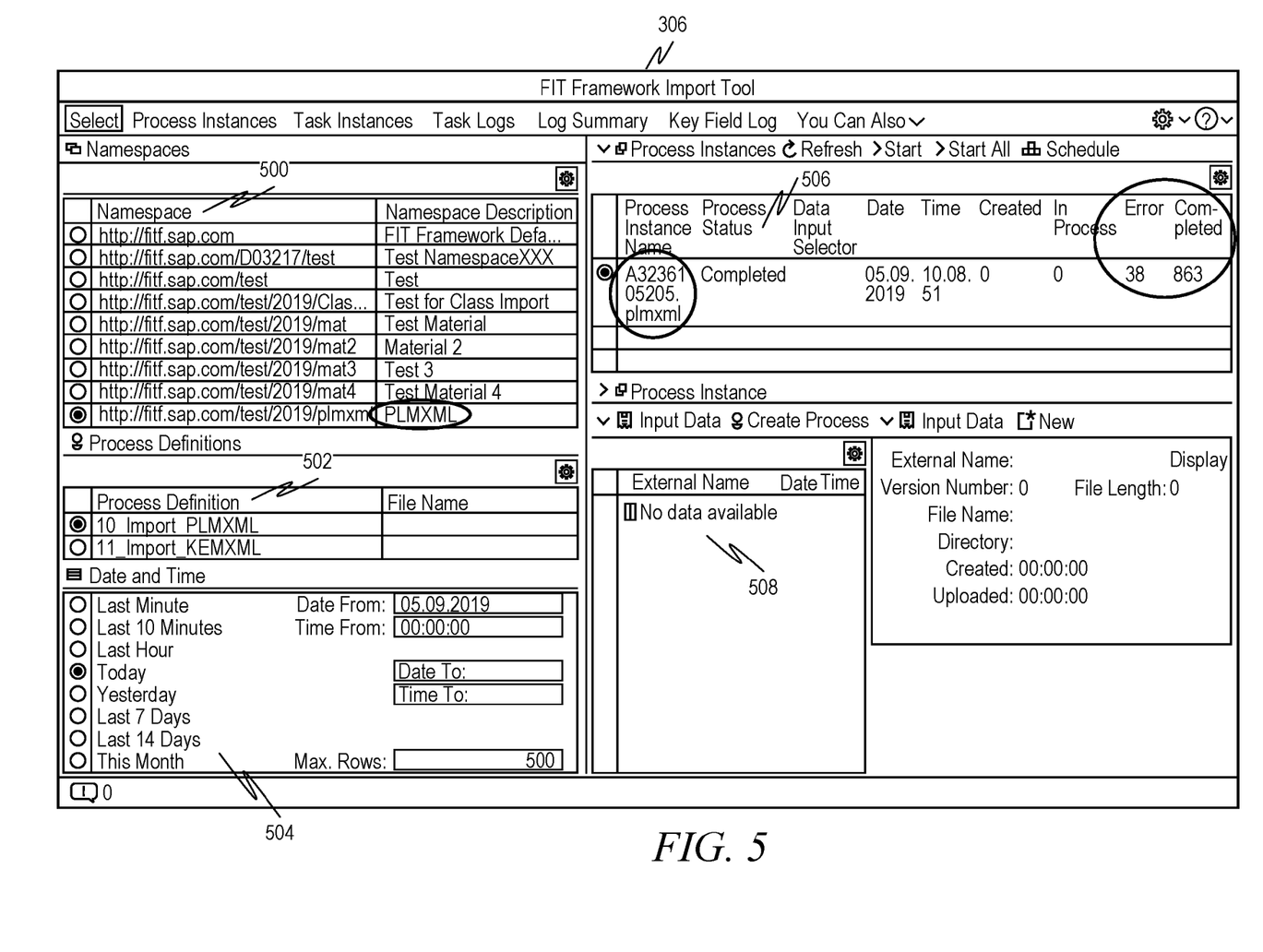
FIG. 5 is a diagram illustrating a screen capture of an import tool, in accordance with an example embodiment.

FIG. 5 is a diagram illustrating a screen capture of an import tool 306, in accordance with an example embodiment. Here, a user may select a namespace from a plurality of namespaces 500. A process definition may be selected from a plurality of process definitions 502, and the user can also specify a date and time range 504 for the data to be imported. The process instances that have had data imported may be listed in area 506, while the input data may be listed in area 508.

Figure 6:
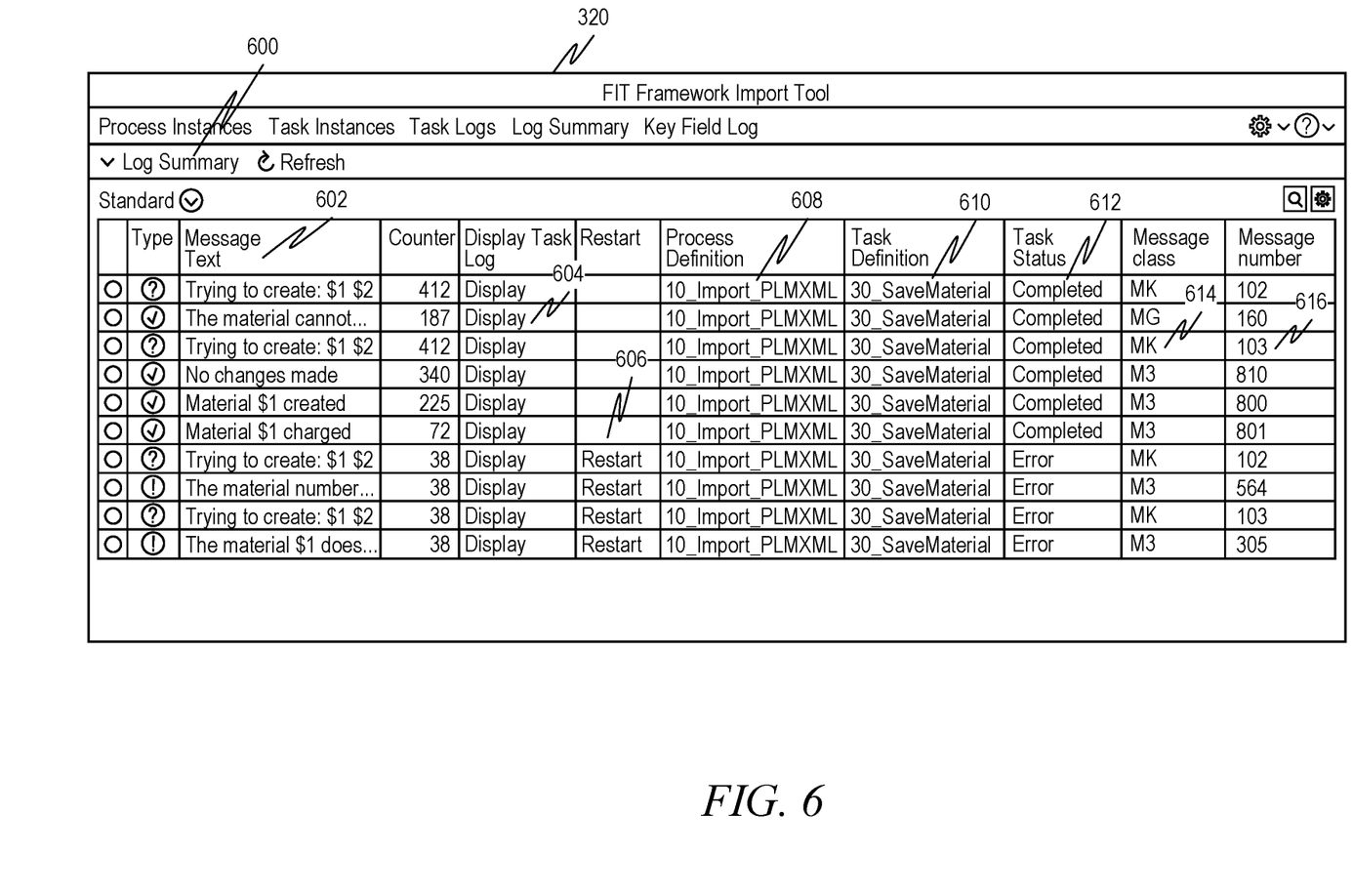
FIG. 6 is a diagram illustrating a screen capture of a processing monitoring user interface, in accordance with an example embodiment.

FIG. 6 is a diagram illustrating a screen capture of a processing monitoring user interface 320, in accordance with an example embodiment. The process monitoring user interface 320 allows a user to see the status of transformations performed on real-world data. For instance, a log summary 600 describes the transformation 602 that took place, buttons 604 to display the task log, buttons 606 to restart the system, process definitions 608 utilized, task definitions 610 utilized, task status 612, message class 614, and message number 616.

Figure 7:
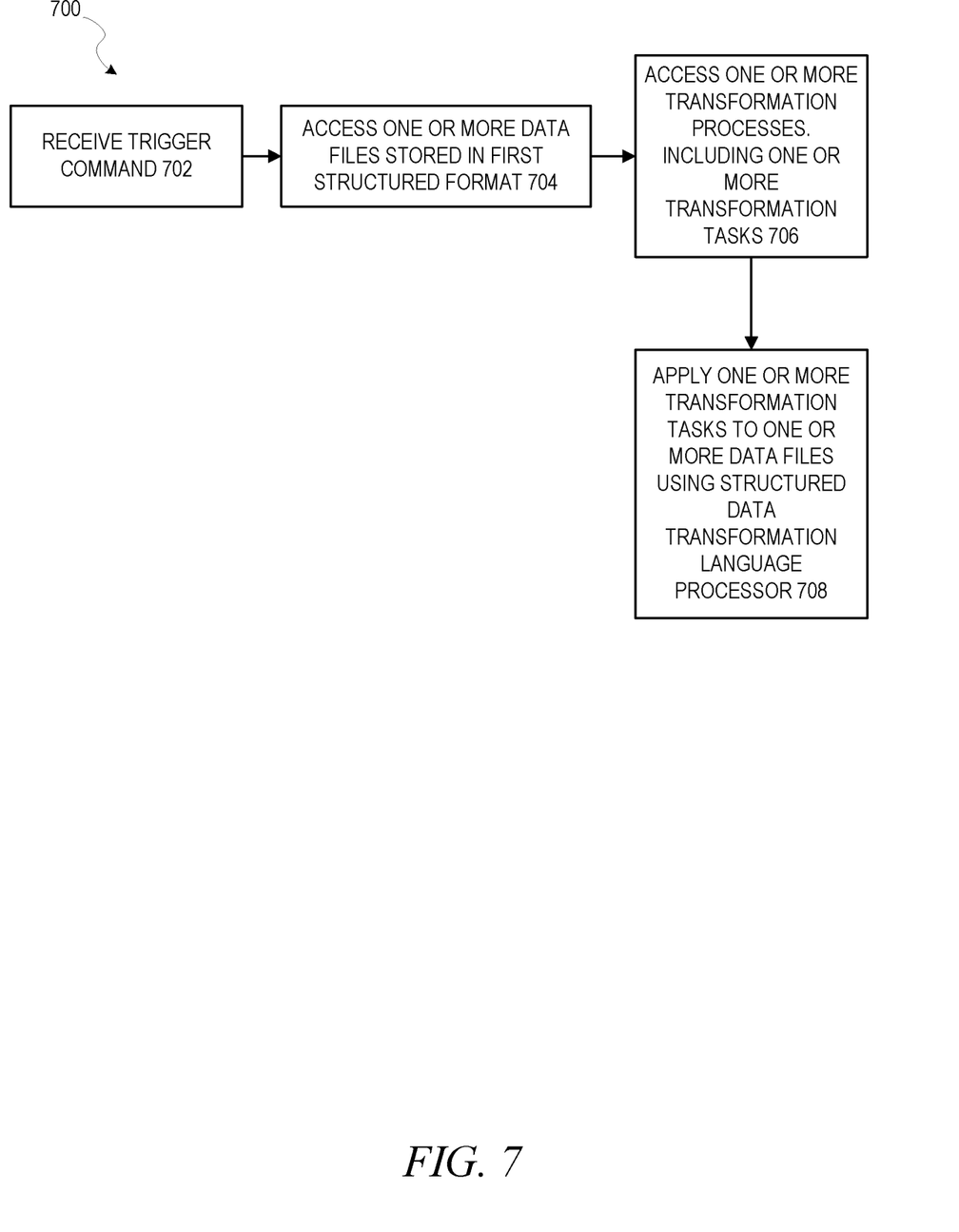
FIG. 7 is a flow diagram illustrating a method for transforming data from a first structured data format to a second structured data format, in accordance with an example embodiment.

FIG. 7 is a flow diagram illustrating a method 700 for transforming data from a first structured data format to a second structured data format, in accordance with an example embodiment. At operation 702, a trigger command is received from an external system storing data in a first structured format. At operation 704, in response to the trigger command, an application storing data in a second structured format accesses one or more files stored in the first structured format. This may be performed by, for example, receiving the data stored in the second structured format via an import tool running on the application or by accessing a separate file system.

At operation 706, one or more transformation processes is accessed, with each transformation process including one or more transformation tasks. These tasks may be specified using XSLT via a process definition user interface on the application. At operation 708, a structured data transformation language processor in the application is used to apply one or more of the one or more transformation tasks on the one or more files, causing a transformation of data in the one or more files into the second structured format. The structured data transformation language processor may be, for example, an XSLT processor, which may operate in a C++ kernel.

In view of the above-described implementations of subject matter, this application discloses the following list of examples, wherein one feature of an example in isolation or more than one feature of said example taken in combination and, optionally, in combination with one or more features of one or more further examples are further examples also falling within the disclosure of this application:

Example 1. A system comprising:
  at least one hardware processor; and
  a computer-readable medium storing instructions that, when executed by the at least one hardware processor, cause the at least one hardware processor to perform operations comprising:
  receiving, from an external system storing data in a first structured format, a trigger command;
  in response to the trigger command, accessing, by an application storing data in a second structured format, one or more files stored in the first structured format;
  accessing one or more transformation processes, each transformation process including one or more transformation tasks; and
  applying, using a structured data transformation language processor in the application, one or more of the one or more transformation tasks on the one or more files, causing a transformation of data in the one or more files into the second structured format.

Example 2. The system of Example 1, wherein the structured data transformation language processor is an Extensible Stylesheet Language Transformations (XSLT) processor.

Example 3. The system of Example 1 or 2, wherein the one or more transformation tasks in one or more of the processes are written in XSLT.

Example 4. The system of Example 2, wherein the XSLT processor is implemented in a C++ kernel.

Example 5. The system of any of Examples 1-4, wherein the one or more transformation tasks include value/structure mappings.

Example 6. The system of any of Examples 1-5, wherein the one or more transformation tasks include field conversions.

Example 7. The system of any of Examples 1-6, wherein the one or more transformation tasks include consistency/value checks.

Example 8. The system of any of Examples 1-7, wherein the one or more transformation tasks include serialization tasks.

Example 9. The system of any of Examples 1-8, wherein the one or more transformation tasks include filtering tasks.

Example 10. The system of any of Examples 1-9, wherein the one or more transformation tasks include splitting tasks.

Example 11. A method comprising:
receiving, from an external system storing data in a first structured format, a trigger command;
in response to the trigger command, accessing, by an application storing data in a second structured format, one or more files stored in the first structured format;
accessing one or more transformation processes, each transformation process including one or more transformation tasks; and
applying, using a structured data transformation language processor in the application, one or more of the one or more transformation tasks on the one or more files, causing a transformation of data in the one or more files into the second structured format.

Example 12. The method of Example 11, wherein the structured data transformation language processor is an Extensible Stylesheet Language Transformations (XSLT) processor.

Example 13. The method of Example 11 or 12, wherein the one or more transformation tasks in one or more of the processes are written in XSLT.

Example 14. The method of Example 12, wherein the XSLT processor is implemented in a C++ kernel.

Example 15. The method of any of Examples 11-14, wherein the one or more transformation tasks include value/structure mappings.

Example 16. The method of any of Examples 11-15, wherein the one or more transformation tasks include field conversions.

Example 17. The method of any of Examples 11-16, wherein the one or more transformation tasks include consistency/value checks.

Example 18. The method of any of Examples 11-17, wherein the one or more transformation tasks include serialization tasks.

Example 19. A non-transitory machine-readable medium storing instructions which, when executed by one or more processors, cause the one or more processors to perform operations comprising:
receiving, from an external system storing data in a first structured format, a trigger command;
in response to the trigger command, accessing, by an application storing data in a second structured format, one or more files stored in the first structured format;
accessing one or more transformation processes, each transformation process including one or more transformation tasks; and
applying, using a structured data transformation language processor in the application, one or more of the one or more transformation tasks on the one or more files, causing a transformation of data in the one or more files into the second structured format.

Example 20. The non-transitory machine-readable medium of Example 19, wherein the structured data transformation language processor is an Extensible Stylesheet Language Transformations (XSLT) processor.

Figure 8:
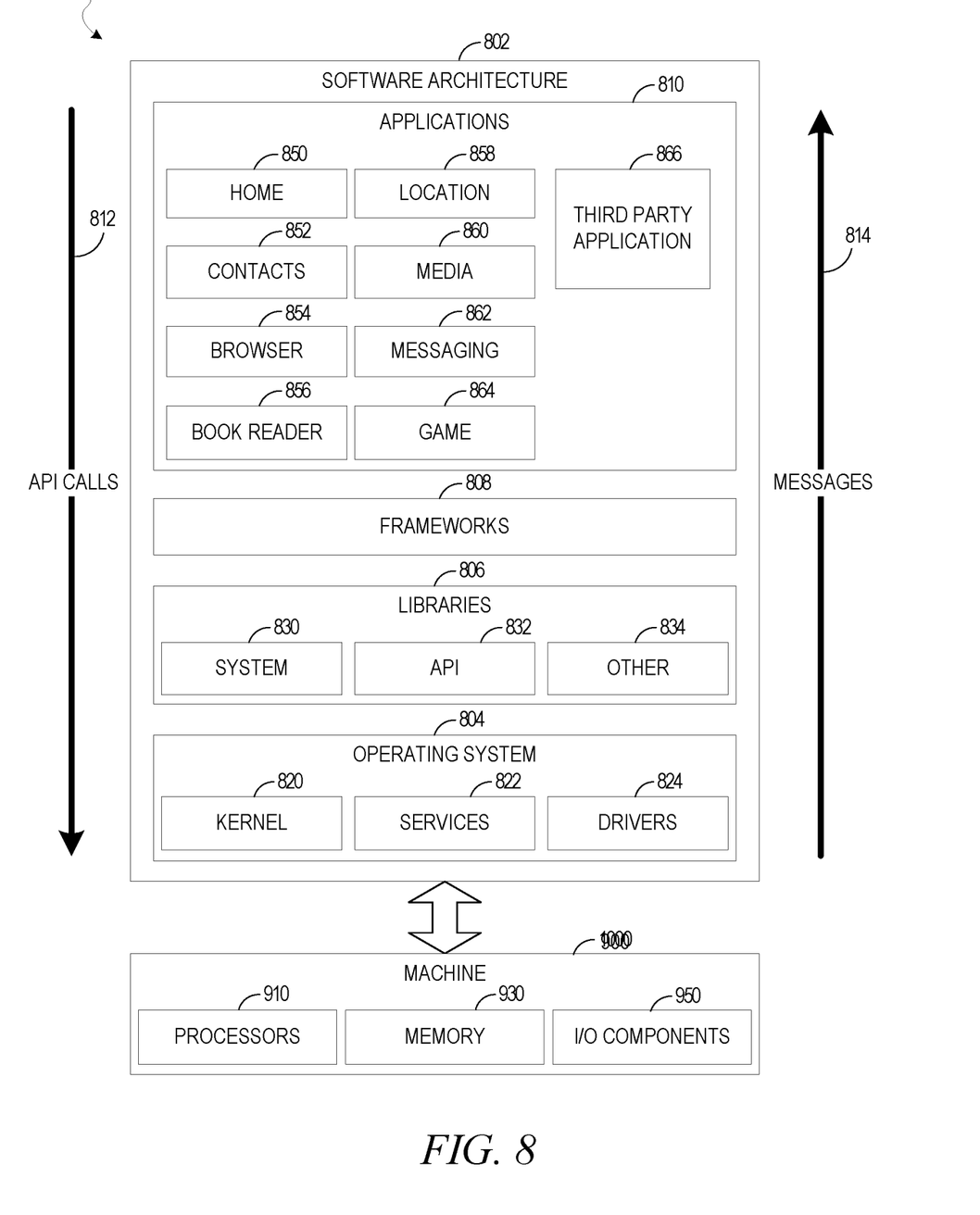
FIG. 8 is a block diagram illustrating an example architecture of software, which can be installed on any one or more of the devices described above.

FIG. 8 is a block diagram 800 illustrating a software architecture 802, which can be installed on any one or more of the devices described above. FIG. 8 is merely a non-limiting example of a software architecture, and it will be appreciated that many other architectures can be implemented to facilitate the functionality described herein. In various embodiments, the software architecture 802 is implemented by hardware such as a machine 900 of FIG. 9 that includes processors 910, memory 930, and input/output (I/O) components 950. In this example architecture, the software architecture 802 can be conceptualized as a stack of layers where each layer may provide a particular functionality. For example, the software architecture 802 includes layers such as an operating system 804, libraries 806, frameworks 808, and applications 810. Operationally, the applications 810 invoke Application Program Interface (API) calls 812 through the software stack and receive messages 814 in response to the API calls 812, consistent with some embodiments.

In various implementations, the operating system 804 manages hardware resources and provides common services. The operating system 804 includes, for example, a kernel 820, services 822, and drivers 824. The kernel 820 acts as an abstraction layer between the hardware and the other software layers, consistent with some embodiments. For example, the kernel 820 provides memory management, processor management (e.g., scheduling), component management, networking, and security settings, among other functionality. The services 822 can provide other common services for the other software layers. The drivers 824 are responsible for controlling or interfacing with the underlying hardware. For instance, the drivers 824 can include display drivers, camera drivers, BLUETOOTH® or BLUETOOTH® Low-Energy drivers, flash memory drivers, serial communication drivers (e.g., Universal Serial Bus (USB) drivers), Wi-Fi® drivers, audio drivers, power management drivers, and so forth.

In some embodiments, the libraries 806 provide a low-level common infrastructure utilized by the applications 810. The libraries 806 can include system libraries 830 (e.g., C standard library) that can provide functions such as memory allocation functions, string manipulation functions, mathematic functions, and the like. In addition, the libraries 806 can include API libraries 832 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two-dimensional (2D) and three-dimensional (3D) in a graphic context on a display), database libraries (e.g., SQLite to provide various relational database functions), web libraries (e.g., WebKit to provide web browsing functionality), and the like. The libraries 806 can also include a wide variety of other libraries 834 to provide many other APIs to the applications 810.

The frameworks 808 provide a high-level common infrastructure that can be utilized by the applications 810. For example, the frameworks 808 provide various GUI functions, high-level resource management, high-level location services, and so forth. The frameworks 808 can provide a broad spectrum of other APIs that can be utilized by the applications 810, some of which may be specific to a particular operating system 804 or platform.

In an example embodiment, the applications 810 include a home application 850, a contacts application 852, a browser application 854, a book reader application 856, a location application 858, a media application 860, a messaging application 862, a game application 864, and a broad assortment of other applications, such as a third-party application 866. The applications 810 can are programs that execute functions defined in the programs. Various programming languages can be employed to create one or more of the applications 810, structured in a variety of manners, such as object-oriented programming languages (e.g., Objective-C, Java, or C++) or procedural programming languages (e.g., C or assembly language). In a specific example, the third-party application 866 (e.g., an application developed using the ANDROID™ or IOS™ software development kit (SDK) by an entity other than the vendor of the particular platform) may be mobile software running on a mobile operating system such as IOS™, ANDROID™ WINDOWS® Phone, or another mobile operating system. In this example, the third-party application 866 can invoke the API calls 812 provided by the operating system 804 to facilitate functionality described herein.

Figure 9:
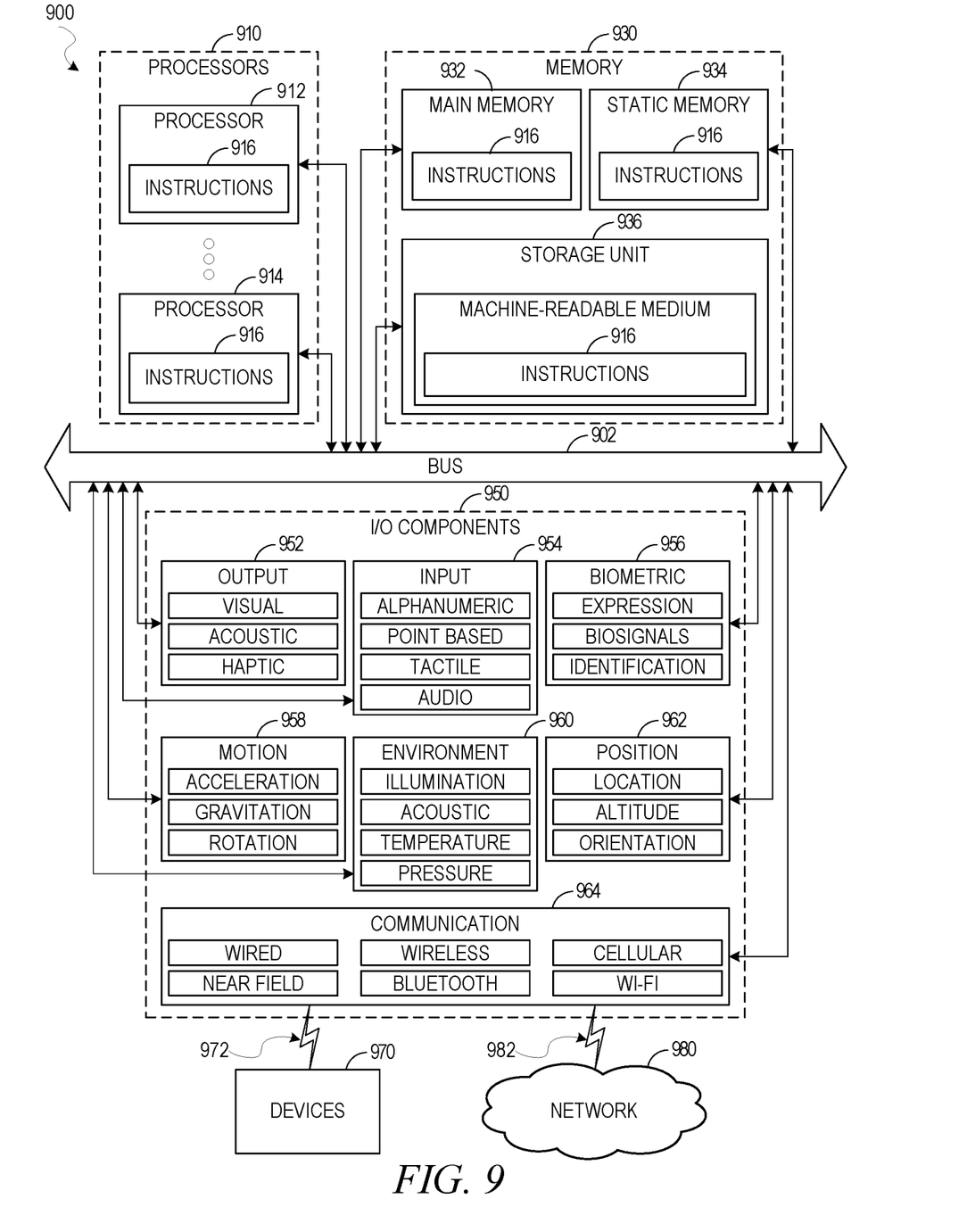
FIG. 9 illustrates a diagrammatic representation of a machine in the form of a computer system within which a set of instructions may be executed for causing the machine to perform any one or more of the methodologies discussed herein.

FIG. 9 illustrates a diagrammatic representation of a machine 900 in the form of a computer system within which a set of instructions may be executed for causing the machine 900 to perform any one or more of the methodologies discussed herein. Specifically, FIG. 9 shows a diagrammatic representation of the machine 900 in the example form of a computer system, within which instructions 916 (e.g., software, a program, an application, an applet, an app, or other executable code) for causing the machine 900 to perform any one or more of the methodologies discussed herein may be executed. For example, the instructions 916 may cause the machine 900 to execute the method of FIG. 7. Additionally, or alternatively, the instructions 916 may implement FIGS. 1-7 and so forth. The instructions 916 transform the general, non-programmed machine 900 into a particular machine 900 programmed to carry out the described and illustrated functions in the manner described. In alternative embodiments, the machine 900 operates as a standalone device or may be coupled (e.g., networked) to other machines. In a networked deployment, the machine 900 may operate in the capacity of a server machine or a client machine in a server-client network environment, or as a peer machine in a peer-to-peer (or distributed) network environment. The machine 900 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 916, sequentially or otherwise, that specify actions to be taken by the machine 900. Further, while only a single machine 900 is illustrated, the term "machine" shall also be taken to include a collection of machines 900 that individually or jointly execute the instructions 916 to perform any one or more of the methodologies discussed herein.

The machine 900 may include processors 910, memory 930, and I/O components 950, which may be configured to communicate with each other such as via a bus 902. In an example embodiment, the processors 910 (e.g., a CPU, a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 912 and a processor 914 that may execute the instructions 916. The term "processor" is intended to include multi-core processors that may comprise two or more independent processors (sometimes referred to as "cores") that may execute instructions 916 contemporaneously. Although FIG. 9 shows multiple processors 910, the machine 900 may include a single processor 912 with a single core, a single processor 912 with multiple cores (e.g., a multi-core processor 912), multiple processors 912, 914 with a single core, multiple processors 912, 914 with multiple cores, or any combination thereof.

The memory 930 may include a main memory 932, a static memory 934, and a storage unit 936, each accessible to the processors 910 such as via the bus 902. The main memory 932, the static memory 934, and the storage unit 936 store the instructions 916 embodying any one or more of the methodologies or functions described herein. The instructions 916 may also reside, completely or partially, within the main memory 932, within the static memory 934, within the storage unit 936, within at least one of the processors 910 (e.g., within the processor's cache memory), or any suitable combination thereof, during execution thereof by the machine 900.

The I/O components 950 may include a wide variety of components to receive input, provide output, produce output, transmit information, exchange information, capture measurements, and so on. The specific I/O components 950 that are included in a particular machine will depend on the type of machine. For example, portable machines such as mobile phones will likely include a touch input device or other such input mechanisms, while a headless server machine will likely not include such a touch input device. It will be appreciated that the I/O components 950 may include many other components that are not shown in FIG. 9. The I/O components 950 are grouped according to functionality merely for simplifying the following discussion, and the grouping is in no way limiting. In various example embodiments, the I/O components 950 may include output components 952 and input components 954. The output components 952 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 954 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 950 may include biometric components 956, motion components 958, environmental components 960, or position components 962, among a wide array of other components. For example, the biometric components 956 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 958 may include acceleration sensor components (e.g., accelerometer), gravitation sensor components, rotation sensor components (e.g., gyroscope), and so forth. The environmental components 960 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 962 may include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 950 may include communication components 964 operable to couple the machine 900 to a network 980 or devices 970 via a coupling 982 and a coupling 972, respectively. For example, the communication components 964 may include a network interface component or another suitable device to interface with the network 980. In further examples, the communication components 964 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 970 may be another machine or any of a wide variety of peripheral devices (e.g., coupled via a USB).

Moreover, the communication components 964 may detect identifiers or include components operable to detect identifiers. For example, the communication components 964 may include radio-frequency identification (RFID) tag reader components, NFC smart tag detection components, optical reader components (e.g., an optical sensor to detect one-dimensional bar codes such as Universal Product Code (UPC) bar code, multi-dimensional bar codes such as QR code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 964, such as location via Internet Protocol (IP) geolocation, location via Wi-Fi® signal triangulation, location via detecting an NFC beacon signal that may indicate a particular location, and so forth.

The various memories (i.e., 930, 932, 934, and/or memory of the processor(s) 910) and/or the storage unit 936 may store one or more sets of instructions 916 and data structures (e.g., software) embodying or utilized by any one or more of the methodologies or functions described herein. These instructions (e.g., the instructions 916), when executed by the processor(s) 910, cause various operations to implement the disclosed embodiments.

As used herein, the terms "machine-storage medium," "device-storage medium," and "computer-storage medium" mean the same thing and may be used interchangeably. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate array (FPGA), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In various example embodiments, one or more portions of the network 980 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 980 or a portion of the network 980 may include a wireless or cellular network, and the coupling 982 may be a Code Division Multiple Access (CDMA) connection, a Global System for Mobile communications (GSM) connection, or another type of cellular or wireless coupling. In this example, the coupling 982 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data transfer technology.

The instructions 916 may be transmitted or received over the network 980 using a transmission medium via a network interface device (e.g., a network interface component included in the communication components 964) and utilizing any one of a number of well-known transfer protocols (e.g., HTTP). Similarly, the instructions 916 may be transmitted or received using a transmission medium via the coupling 972 (e.g., a peer-to-peer coupling) to the devices 970. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 916 for execution by the machine 900, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

What is claimed is:

1. A system comprising:
   at least one hardware processor; and
   a computer-readable medium storing instructions that, when executed by the at least one hardware processor, cause the at least one hardware processor to perform operations comprising:
   receiving, from an external system storing data in a first structured format, a trigger command;
   in response to the trigger command, accessing, by a software application storing data in a second structured format in a database, one or more files stored in the first structured format;
   accessing one or more transformation processes, each transformation process including one or more transformation tasks;
   applying, using a structured data transformation language processor in the software application, one or more of the one or more transformation tasks on the one or more files, causing a transformation of data in the one or more files into the second structured format; and
   creating, at the software application, one or more objects from the one or more files in the second structured format, the one or more objects defining a graphical user interface.

2. The system of claim 1, wherein the structured data transformation language processor is an Extensible Stylesheet Language Transformations (XSLT) processor.

3. The system of claim 1, wherein the one or more transformation tasks in one or more of the processes are written in XSLT.

4. The system of claim 2, wherein the XSLT processor is implemented in a C++ kernel.

5. The system of claim 1, wherein the one or more transformation tasks include value/structure mappings.

6. The system of claim 1, wherein the one or more transformation tasks include field conversions.

7. The system of claim 1, wherein the one or more transformation tasks include consistency/value checks.

8. The system of claim 1, wherein the one or more transformation tasks include serialization tasks.

9. The system of claim 1, wherein the one or more transformation tasks include filtering tasks.

10. The system of claim 1, wherein the one or more transformation tasks include splitting tasks.

11. A method comprising:
    receiving, from an external system storing data in a first structured format, a trigger command;
    in response to the trigger command, accessing, by a software application storing data in a second structured format in a database, one or more files stored in the first structured format;
    accessing one or more transformation processes, each transformation process including one or more transformation tasks;
    applying, using a structured data transformation language processor in the software application, one or more of the one or more transformation tasks on the one or more files, causing a transformation of data in the one or more files into the second structured format; and
    creating, at the software application, one or more objects from the one or more files in the second structured format, the one or more objects defining a graphical user interface.

12. The method of claim 11, wherein the structured data transformation language processor is an Extensible Stylesheet Language Transformations (XSLT) processor.

13. The method of claim 11, wherein the one or more transformation tasks in one or more of the processes are written in XSLT.

14. The method of claim 12, wherein the XSLT processor is implemented in a C++ kernel.

15. The method of claim 11, wherein the one or more transformation tasks include value/structure mappings.

16. The method of claim 11, wherein the one or more transformation tasks include field conversions.

17. The method of claim 11, wherein the one or more transformation tasks include consistency/value checks.

18. The method of claim 11, wherein the one or more transformation tasks include serialization tasks.

19. A non-transitory machine-readable medium storing instructions which, when executed by one or more processors, cause the one or more processors to perform operations comprising:
    receiving, from an external system storing data in a first structured format, a trigger command;
    in response to the trigger command, accessing, by a software application storing data in a second structured format in a database, one or more files stored in the first structured format;
    accessing one or more transformation processes, each transformation process including one or more transformation tasks;
    applying, using a structured data transformation language processor in the software application, one or more of the one or more transformation tasks on the one or more files, causing a transformation of data in the one or more files into the second structured format; and
    creating, at the software application, one or more objects from the one or more files in the second structured format, the one or more objects defining a graphical user interface.

20. The non-transitory machine-readable medium of claim 19, wherein the structured data transformation language processor is an Extensible Stylesheet Language Transformations (XSLT) processor.

* * * * *